(12) United States Patent
Hinderling et al.

(10) Patent No.: US 11,725,935 B2
(45) Date of Patent: Aug. 15, 2023

(54) DISTANCE METER COMPRISING SPAD ARRANGEMENT FOR CONSIDERATION OF MULTIPLE TARGETS

(71) Applicant: HEXAGON TECHNOLOGY CENTER GMBH, Heerbrugg (CH)

(72) Inventors: Jürg Hinderling, Marbach (CH); Simon Bestler, Langenargen (DE); Thomas Piok, Koblach (AT); Andreas Walser, St.Gallen (CH); Rainer Wohlgenannt, Klaus (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 788 days.

(21) Appl. No.: 16/048,494

(22) Filed: Jul. 30, 2018

(65) Prior Publication Data
US 2019/0063915 A1 Feb. 28, 2019

(30) Foreign Application Priority Data
Jul. 31, 2017 (EP) .................................. 17184095

(51) Int. Cl.
*G01C 3/00* (2006.01)
*G01S 7/48* (2006.01)
(Continued)

(52) U.S. Cl.
CPC ................ *G01C 3/08* (2013.01); *G01S 7/487* (2013.01); *G01S 7/4816* (2013.01);
(Continued)

(58) Field of Classification Search
CPC .......... G01C 3/08; G01S 7/4861; G01S 17/08
(Continued)

(56) References Cited

U.S. PATENT DOCUMENTS

| 5,682,229 A | 10/1997 | Wangler |
| 5,892,575 A * | 4/1999 | Marino .................... G01C 3/08 |

(Continued)

FOREIGN PATENT DOCUMENTS

| CN | 101449181 A | 6/2009 |
| CN | 101836077 A | 9/2010 |

(Continued)

OTHER PUBLICATIONS

Spink, Charles. "The Deconvolution of Differential Scanning Calorimetry Unfolding Transitions." Methods 76:78-86. Academic Press Inc. Elsevier Science. (Apr. 2015). (Year: 2015).*

(Continued)

*Primary Examiner* — James R Hulka
(74) *Attorney, Agent, or Firm* — Maschoff Brennan

(57) ABSTRACT

A distance meter for the high-accuracy single-point distance measurement to a target point by means of an oriented emitted beam, wherein the receiver has an optoelectronic sensor based on an arrangement of microcells for acquiring the received beam. The receiver and a computer unit are configured in this case for deriving a set of runtimes with respect to different cross-sectional components of the received beam acquired using subregions of the receiver, and therefore, for example, an evaluation is enabled as to whether the received beam has parts of the emitted beam reflected on a single target or a multiple target in its lateral extension.

14 Claims, 7 Drawing Sheets

(51) Int. Cl.
| | |
|---|---|
| *G01C 3/08* | (2006.01) |
| *G01S 7/4861* | (2020.01) |
| *G01S 17/08* | (2006.01) |
| *G01S 7/4865* | (2020.01) |
| *G01S 17/10* | (2020.01) |
| *G01S 7/481* | (2006.01) |
| *G01S 7/4863* | (2020.01) |
| *G01S 7/487* | (2006.01) |

(52) U.S. Cl.
CPC .......... *G01S 7/4861* (2013.01); *G01S 7/4863* (2013.01); *G01S 7/4865* (2013.01); *G01S 17/08* (2013.01); *G01S 17/10* (2013.01)

(58) Field of Classification Search
USPC ........................................................ 356/4.01
See application file for complete search history.

(56) References Cited

U.S. PATENT DOCUMENTS

| | | | |
|---|---|---|---|
| 6,400,448 B1* | 6/2002 | Sugawara et al. | G01C 3/08 |
| 6,480,270 B1 | 11/2002 | Studnicka et al. | |
| 6,657,705 B2* | 12/2003 | Sano | G01S 17/46 356/4.01 |
| 6,930,297 B1* | 8/2005 | Nakamura | G01B 9/04 |
| 7,560,679 B1* | 7/2009 | Gutierrez | H01L 27/00 |
| 7,656,508 B2* | 2/2010 | Iwaki | G01C 3/08 356/4.03 |
| 7,760,335 B2* | 7/2010 | Wolf | G01S 7/4816 356/4.01 |
| 7,800,739 B2 | 9/2010 | Rohner et al. | |
| 7,944,548 B2* | 5/2011 | Eaton | G01C 3/08 |
| 7,995,189 B2* | 8/2011 | Yamaguchi | G01B 11/026 356/3.01 |
| 8,102,516 B2* | 1/2012 | Imamura | G01C 3/08 356/6 |
| 8,130,368 B2 | 3/2012 | Eno et al. | |
| 8,269,984 B2 | 9/2012 | Hinderling et al. | |
| 8,355,117 B2* | 1/2013 | Niclass | G01C 3/08 |
| 8,698,943 B2* | 4/2014 | Isogai et al. | H04N 5/232 |
| 8,773,550 B2* | 7/2014 | Kane et al. | G06K 9/00 |
| 8,773,642 B2* | 7/2014 | Eisele et al. | G01C 3/08 |
| 8,848,171 B2 | 9/2014 | Stutz et al. | |
| 8,848,172 B2* | 9/2014 | Eisele et al. | G01C 3/02 |
| 8,891,068 B2* | 11/2014 | Eisele et al. | G01C 15/002 |
| 8,896,843 B2* | 11/2014 | Rohner et al. | G01B 9/02 |
| 8,908,157 B2* | 12/2014 | Eisele et al. | G01C 15/002 |
| 8,908,159 B2 | 12/2014 | Mimeault | |
| 9,041,918 B2* | 5/2015 | Eisele et al. | G01S 17/10 |
| 9,182,492 B2* | 11/2015 | Godbaz et al. | G01S 17/89 |
| 9,201,138 B2* | 12/2015 | Eisele et al. | G01S 7/4816 |
| 9,335,415 B2 | 5/2016 | Jungwirth | |
| 9,347,773 B2* | 5/2016 | Stutz et al. | G01C 3/08 |
| 9,348,018 B2* | 5/2016 | Eisele et al. | G01S 7/481 |
| 9,426,444 B2* | 8/2016 | Guigues et al. | H04N 13/0022 |
| 9,638,520 B2* | 5/2017 | Eisele et al. | G01C 3/08 |
| 9,677,870 B2* | 6/2017 | Jensen | G01B 9/02049 |
| 9,709,677 B2* | 7/2017 | Eisele et al. | G01S 17/10 |
| 9,835,438 B2* | 12/2017 | Ohsawa | G06T 7/521 |
| 9,841,580 B2* | 12/2017 | Ikemoto | G01C 3/14 |
| 9,866,819 B2* | 1/2018 | Suzuki | H04N 13/246 |
| 9,874,629 B2* | 1/2018 | Kostamovaara | G01C 3/08 |
| 9,897,697 B2 | 2/2018 | Singer | |
| 9,952,323 B2* | 4/2018 | Deane | G01S 7/4817 |
| 10,365,354 B2 | 7/2019 | Schmidtke | |
| 10,502,816 B2 | 12/2019 | Rae et al. | |
| 2002/0196424 A1* | 12/2002 | Sano et al. | G01C 3/08 |
| 2005/0243302 A1* | 11/2005 | Pain et al. | G01C 3/08 |
| 2007/0182949 A1* | 8/2007 | Niclass | G01C 3/08 356/3 |
| 2008/0079954 A1* | 4/2008 | Iwaki et al. | G01B 11/14 |
| 2009/0009747 A1* | 1/2009 | Wolf et al. | G01B 11/14 |
| 2009/0122295 A1 | 5/2009 | Eaton | |
| 2010/0045963 A1* | 2/2010 | Yamaguchi et al. | G01C 3/08 |
| 2010/0128249 A1* | 5/2010 | Imamura | G01C 3/00 |
| 2012/0236290 A1* | 9/2012 | Eisele | G01C 25/00 356/6 |
| 2012/0242998 A1* | 9/2012 | Rohner | G01B 9/02082 356/486 |
| 2012/0249998 A1* | 10/2012 | Eisele | G01S 7/4816 356/5.01 |
| 2012/0261547 A1* | 10/2012 | Eisele | G01J 1/0448 250/201.1 |
| 2012/0262696 A1* | 10/2012 | Eisele | G01S 7/4863 356/4.01 |
| 2012/0300114 A1* | 11/2012 | Isogai | H04N 13/271 348/345 |
| 2013/0116977 A1* | 5/2013 | Godbaz | G01S 17/34 702/189 |
| 2013/0194390 A1* | 8/2013 | Hirooka | G01C 11/025 |
| 2013/0208258 A1* | 8/2013 | Eisele | G01C 3/02 356/5.01 |
| 2013/0222624 A1* | 8/2013 | Kane | H04N 5/2226 348/208.4 |
| 2014/0071433 A1* | 3/2014 | Eisele | G01S 7/481 356/5.01 |
| 2014/0078491 A1 | 3/2014 | Eisele et al. | |
| 2014/0139846 A1* | 5/2014 | Jensen | G01B 9/02057 356/493 |
| 2014/0168632 A1* | 6/2014 | Eisele | G01S 7/497 356/5.01 |
| 2014/0253679 A1 | 9/2014 | Guigues et al. | |
| 2014/0307085 A1* | 10/2014 | Ohsawa | G01B 11/026 |
| 2014/0333918 A1* | 11/2014 | Stutz | G01S 17/36 356/5.01 |
| 2015/0002638 A1* | 1/2015 | Suzuki et al. | H04N 13/0246 |
| 2015/0138529 A1 | 5/2015 | Singer | |
| 2015/0177369 A1* | 6/2015 | Kostamovaara | G01S 7/4865 |
| 2015/0285625 A1* | 10/2015 | Deane | G01S 7/4816 348/140 |
| 2015/0286031 A1* | 10/2015 | Ikemoto | G02B 7/287 |
| 2015/0293226 A1* | 10/2015 | Eisele | G01S 17/10 356/5.01 |
| 2019/0063914 A1* | 2/2019 | Mayer | G01C 15/002 |
| 2019/0064323 A1* | 2/2019 | Mayer | G01S 7/4863 |
| 2019/0094346 A1* | 3/2019 | Dumoulin | G01S 17/26 |
| 2020/0284883 A1* | 9/2020 | Ferreira | G01S 17/10 |

FOREIGN PATENT DOCUMENTS

| | | | | |
|---|---|---|---|---|
| CN | 102549381 A | 7/2012 | | |
| CN | 102667521 A | 9/2012 | | |
| CN | 103443648 A | 12/2013 | | |
| CN | 103502841 A | 1/2014 | | |
| CN | 103792540 A | 5/2014 | | |
| CN | 104412120 A | 3/2015 | | |
| CN | 105043539 A | 11/2015 | | |
| CN | 105066953 A | 11/2015 | | |
| CN | 106415313 A | 2/2017 | | |
| CN | 106896369 A | 6/2017 | | |
| DE | 10 2010 049 672 B3 | 2/2012 | | |
| DE | 102011089629 A1 | 6/2012 | | |
| DE | 102011089629 A1 * | 6/2012 | ............. | H04N 5/30 |
| DE | 102011005746 A1 | 9/2012 | | |
| EP | 1832897 B1 | 11/2010 | | |
| EP | 2 469 301 A1 | 6/2012 | | |
| EP | 2538242 A1 | 12/2012 | | |
| EP | 2 708 914 A1 | 3/2014 | | |
| EP | 2686703 B1 * | 7/2018 | .......... | G01S 7/4863 |
| IL | 228545 A | 1/2019 | | |
| JP | 2007-127475 A | 5/2007 | | |
| JP | 2008-292370 A | 12/2008 | | |
| WO | WO-2012126659 A1 * | 9/2012 | ............. | G01S 17/42 |

OTHER PUBLICATIONS

Crilly, Paul B. "A Quantitative Evaluation of Various Iterative Deconvolution Algorithms." IEEE Transactions on Instrumentation and Measurement 40.3:558-562 (Jun. 1991). (Year: 1991).*

(56) References Cited

OTHER PUBLICATIONS

European Search Report in application No. 17184095.2 dated Feb. 19, 2018.
M. Yokoyama, et al.: "Development of Multi-Pixel Photon Counters" SNIC Symposium, Stanford, California, Apr. 3-6, 2006.
Gundacker and Heering, "The silicon photomultiplier: fundamentals and applications of a modern solid-state photon detector" Phys. Med. Biol. 65 (2020).

* cited by examiner

DISTANCE METER COMPRISING SPAD ARRANGEMENT FOR CONSIDERATION OF MULTIPLE TARGETS

CROSS-REFERENCE TO RELATED APPLICATIONS

This application claims priority to European Patent Application No. 1718095.2 filed on Jul. 31, 2017, which is incorporated herein by reference.

FIELD OF THE INVENTION

The invention relates to a distance meter for the high-accuracy single-point distance measurement to a target point by means of an oriented, in particular collimated emitted beam, wherein multiple targets are recognized during the processing of the reception signal.

BACKGROUND

The optoelectronic distance meter according to the invention is suitable, for example, for distance and coordinate measuring devices in the fields of geodesy and industrial surveying, where typically LIDAR, laser trackers, tachymeters, laser scanners, or profilers are used.

Various principles and methods are known in the field of electronic or electrooptical distance measurement. One approach consists of emitting pulsed electromagnetic radiation, for example, laser light, toward a target to be surveyed and subsequently receiving an echo from this target as the backscattering object, wherein the distance to the target to be surveyed can be determined, for example, on the basis of the runtime, the form, and/or the phase of the pulse. Such laser distance meters have become widespread in many fields in the meantime as standard solutions.

Two different approaches or a combination thereof are typically used for the detection of the backscattered pulse of a backscattered pulse sequence.

In the so-called threshold value method, a light pulse is detected when the intensity of the radiation incident on a detector of the distance measuring device used exceeds a certain threshold value. This threshold value prevents noise and interfering signals from the background from being incorrectly detected as a useful signal, i.e., as backscattered light of the emitted pulse.

The other approach is based on the sampling of the backscattered pulse. This approach is typically used in the case of weak backscattered signals (for example, pulse signals), as are caused, for example, due to greater measurement distances. This method can also be considered to be integral signal acquisition, wherein both the overall signal information and also the essential noise information are acquired by the sampling. This results, for example, in an enhancement of the measurement accuracy. An emitted signal is detected by the radiation acquired by a detector being sampled, a signal being identified within the sampled range, and finally a location of the signal being determined chronologically. Due to the use of a plurality of sampled values and/or summation of the reception signal synchronized with the emission rate, a useful signal can be identified even under unfavorable circumstances, and therefore greater distances or background scenarios which are noisy or subject to interference can also be managed.

Presently, in this case the entire waveform of the analog signal of the radiation acquired by a detector is frequently sampled by means of the waveform digitization method ("waveform digitizing", WFD). After identification of the coding of the associated emitted signal (ASK, FSK, PSK, etc.) of a received signal, a signal runtime ("pulse runtime") is determined very accurately from a defined curve point of the sampled, digitized, and reconstructed signal, for example, the inflection points, the curve maxima, or integrally by means of an optimum filter known from time interpolation.

Alternatively or additionally to the determination of the pulse runtime, a (rapid) sampling often also takes place with respect to pulses or pulse sequences coded or modulated with respect to amplitude, phase, polarization, wavelength, and/or frequency of coded or modulated pulses or pulse sequences.

For example, in the case of the approach of the chronologically very precise sampling of the backscattered signal, the electrical signal generated by the detector is converted by means of an analog-to-digital converter (ADC) into a digital signal sequence. This digital signal is subsequently further processed, usually in real time. In a first step, this signal sequence is decoded by special digital filters, i.e., recognized, and finally the location of a signature describing a time interval within the signal sequence is determined. Examples of time-resolving signatures are center of gravity, sine/cosine transformation, or, for example, amplitude-scaled FIR filter ("finite impulse response filter") comprising a weight coefficient set derived from the pulse form. To eliminate possible distance drifts, a corresponding time-resolving signature from an internal starting signal is also compared. To avoid irreversible sampling errors, additional digital signal transformations known to a person skilled in the art, for example, resampling, are applied.

One of the simplest types of modulation is the identification of the individual pulses or the pulse sequences via interval coding as described, for example, in EP 1 832 897 B1. This is used for the purpose of reidentification ability, for example. This reidentification is required if an ambiguity arises, which can be induced by different situations in the runtime measurement of pulses, for example if more than one pulse or one pulse group is located between surveying device and target object. The pulse coding is advantageous in particular, for example, in multibeam systems consisting of multiple laser beams and associated receiving sensors.

Target objects for a distance measurement can in this case be, on the one hand, natural surfaces of objects such as house walls, roads, windows, objects provided with a coat of paint, matte or glossy metal surfaces, and the like. On the other hand, however, target panels such as retroreflective films or corner cubes can also be used as target objects.

When measuring surfaces using a laser beam, the light is scattered and reflected differently depending on the optical properties and the mechanical condition. In the case of rough or matte surfaces, the light is scattered uniformly in all directions according to Lambert's law. In the case of surfaces having gloss, a substantial part is reflected in the mirroring direction, and in the case of surfaces having texture, complex backscatter patterns having high intensity can arise.

Since the backscattering primarily does not take place in the direction of the distance measuring device—even in the case of surfaces having Lambertian scattering behavior—the probability is very high that the scattered or reflected light will strike a further surface and experience backscattering again. Multiple reflections impair the distance measurement. A distance measuring device is therefore generally designed such that a receiving device of the distance measuring device only has a very small field of vision, whereby multiply reflected retroreflection is no longer in the field of vision of the distance measuring device. Even a laser beam having low divergence does not help in this regard—for example, a Bessel beam generated by a hologram is reflected via multiple scattering precisely like a Gaussian laser beam and a distance measurement is thus corrupted.

A further problem in the measurement of surfaces using a laser beam results from the finite lateral dimensions of the emitter-side laser measurement beam. The lateral resolution on the target object is thus generally limited and, due to the finite lateral beam diameter, more than one surface can be acquired, for example, double targets if the emitted beam passes over edges, steps, or corners. Rapid receiving sensors which are suitable for millimeter-accuracy distance measurement, such as avalanche photodiodes (APD) or PIN diodes ("positive intrinsic negative diode") do not have a location resolution like cameras. Cameras, for example, having an autofocus optical unit, can spatially resolve corners, edges, and signatures of surfaces of objects, but do not have the required time resolution by multiple orders of magnitude.

It is true that a distance meter based on the WFD method can recognize and possibly resolve multiple targets, for example, if the received pulses associated with the targets are sufficiently far apart from one another. The capability of separating multiple objects is thus dependent, for example, on the receiver bandwidth. If the receiver bandwidth is less than 1 GHz, for example, objects which are spaced apart closer than 30 cm cannot be sufficiently separated. In the case of edges, steps, and corners, an overlap of the return pulses therefore arises, for example, and the individual distances cannot be measured sufficiently accurately. The WFD method does recognize an anomaly of the received pulse in the form of pulse widening, but a sufficiently accurate decomposition into two individual pulses is not possible.

The result of multiple reflections or multiple targets are artifacts in the ascertained point clouds, in particular when measuring objects having partial gloss such as metal parts or windowpanes or when measuring edges and corners. The artifacts include walls reflected in windowpanes, a distorted shape of planes in corners, external objects reflected via glossy pipes or handrails in the angle direction of the laser beam, etc.

Measures for a compensation of artifacts caused by multiple reflections and multiple targets in the scope of a distance measurement are presently little-known. Modern distance meters which are based on the principle of waveform digitization (WFD) can detect, for example, the distortion of the signal form or pulse form which arises due to overlapping multiple reflections or multiple targets. In the case of such occurrences, the result of the distance measurement is generally discarded.

In the case of multiple reflections or multiple targets in which the distance between respective associated distance values is greater than the width of the waveform of a single reflection signal, the two distance values associated with the targets are output. In the case of conventional measuring devices, however, it is not possible to determine which object is located exactly in the idealized spatial measurement direction. For example, if the laser beam is incident during the distance measurement simultaneously on the edge of a doorframe and the wall behind it in the room, two distances which are quite exact per se are thus output, but there is no statement about the real surface in this measurement direction. The two objects appear to overlap.

Devices are also known which suppress determined multiple reflections by spatial filtering, for example wherein multiple reflections are suppressed which are reflected back to the optical receiving unit at an angle which is greater than the receiving angle of the measuring device (FOV). A special aperture arrangement acts as a spatial filter and only signals are received which have a beam angle within the field of vision (FOV). The problems of multiple targets remain in existence within the reception field of vision, however. Present distance meters have a field of vision of typically one to five millirad.

SUMMARY

An object of some embodiments of the present invention is to provide a distance measuring method and a distance meter, whereby the disadvantages known from the prior art are avoided, in particular wherein three-dimensionally precise measurements are enabled even for diffusely scattering and reflective surfaces having complex morphological surface having multiple reflections in the lateral beam diameter.

This object is achieved by the implementation of the characterizing features of the independent claims. Features which refine the invention in an alternative or advantageous manner can be inferred from the dependent patent claims.

Some embodiments of the invention relate to a distance meter, in particular for use in a laser scanner, tachymeter, profiler, laser tracker, LIDAR measuring device, or handheld distance measuring device, for a distance measurement to a target point, comprising a transmitter which is configured to generate an oriented, in particular collimated emitted beam for a single-point measurement to the target point, in particular a pulsed laser measurement beam, a receiver which is configured to acquire at least a part of the emitted beam returning from the target point, referred to hereafter as the received beam, and a computer unit which is configured to derive a distance to the target point based on the received beam.

According to some embodiments of the present invention, the receiver for acquiring the received beam has an optoelectronic sensor based on an arrangement of microcells, in particular wherein the sensor is designed as an arrangement of single-photon avalanche photodiodes (SPAD arrangement), and the receiver and the computer unit are configured such that a set of individually readable subregions of the receiver is definable. Furthermore, the receiver and the computer unit are configured to derive a set of runtimes with respect to different cross-sectional components of the received beam acquired using the subregions of the receiver, whereby, for example, an evaluation of the received beam based on the runtimes can be carried out, wherein the evaluation specifies whether the received beam has in its cross section parts of the emitted beam returning from a single target or a multiple target.

Assemblies of single-photon avalanche photodiodes, also called SPAD arrangements or SPAD arrays, are generally arranged as a matrix structure on a chip. The SPAD array technology differs strongly from the bipolar APD technology; in particular, SPAD arrays have a low break voltage and can be manufactured by means of conventional CMOS technology. The arrangements or chips having a photosensitivity in the visible and near infrared spectral range are also referred to as SiPM (silicon photomultiplier). The SiPM are gradually replacing the previously used photomultiplier tubes, in particular in the visible and near-ultraviolet spectral range. SiPM have a high spectral sensitivity in the visible wavelength range. For example, SPAD arrays are available in the prior art, which are sensitive up into the near infrared range, up to well over 900 nm wavelength.

Commercial SPAD arrays are also available at wavelengths between 800 nm and 1800 nm. These sensors primarily consist of the semiconductor material InGaAs. These sensors also have an external or internal matrix structure above the photosensitive surface depending on the design. Distance measuring systems comprising SPAD arrays in this spectral range have the advantage, for example, that the solar background light (daylight) is significantly lower in relation to the visible wavelength range and this interfering luminous flux thus less impairs a signal detection by means of SPAD arrays.

According to one embodiment, the SPAD arrangement is configured, for example, such that it has at least one of the following properties: a photosensitivity for wavelengths between 300 nm and 1100 nm, in particular wherein the SPAD arrangement is based on a silicon receiver, and a photosensitivity for wavelengths between 700 nm and 2000 nm, in particular wherein the SPAD arrangement is based on an InGaAs receiver.

One special feature of SPAD arrangements is, for example, that individual subsets of microcells are separately activatable.

If the emitted beam is thus incident, for example, on two objects simultaneously, for example, the left half of the beam bundle on a first object A and the right half of the beam bundle on a second object B and if the objects A and B are at different distances, the returning light is thus conducted with just these different distances onto the SPAD array. The individual SPAD microcells now trigger differently with respect to time in accordance with the respective distance of the objects A and B.

To be able to detect this perfectly, for example, very rapid electronics having GHz bandwidth range is required, to chronologically separate the pulses of objects A and B, which is very complex, however, or the microcells can be sequentially activated locally, for example, first line-by-line and then column-by-column activation and readout, to thus also query the position on the receiver and thus, for example, the directions to the distances of the objects A and B. Alternatively, the microcells can be successively activated chronologically synchronized with the emitted signal sequence, specifically two subregions (binning) of lines and of columns in each case, wherein the activation and readout runs comparably to a cell addressing of a matrix, wherein the directions and distances of the objects can be ascertained by the received data thus obtained. Thus, for example, two or more objects which are struck by the same laser beam can be identified and measured even if the mutual distance interval thereof is less than the laser beam diameter. Moreover, edges and corners of objects can be acquired and resolved with higher lateral location resolution than the laser beam itself. The reception-side high resolution of location and time by means of SPAD array thus also functions for more than two surfaces. A three-dimensional spatial image can be acquired over the cross section of the light fan generated by a laser beam by means of the thousands or tens of thousands of microcells and the combination thereof into readable subregions (domains) having associated time measuring circuits.

Applications having high location resolution are of interest, for example, for laser trackers, but also for scanners when measuring edges, corners, steps, slots, grooves, and boreholes of structures such as building façades.

A further special feature of SPAD arrays is the high amplification thereof. Therefore, they have heretofore been used, for example, in the case of very weak optical signals, where only 1 to 50 photons are incident on the sensor. Such airborne sensors are also referred to as SPL-LIDAR (SPL="single-photon lidar"). In the case of only a few photons, however, the distance noise is substantial and is typically 10 mm to 100 mm. Moreover, the absolute distance measurement accuracy is influenced by the signal strength, this is the case in particular in SPAD arrays having few microcells. By way of special measures, for example, a range walk compensation and using adequately short laser pulses of less than 500 ps, in contrast, a distance noise of much less than 1 mm can be achieved, whereby a measurement accuracy of 0.1 mm is achieved. This corresponds to a typical time resolution of one picosecond or less.

According to a further embodiment, for example, the transmitter is configured to provide the emitted beam as pulsed laser measurement radiation, in particular having an individual pulse duration of less than 500 picoseconds, especially less than 100 picoseconds.

Since SPAD array sensors are primarily designed for the purpose of being able to detect single photons perfectly, they are also referred to as "multi-pixel photon counters" (MPPC). The SPAD arrays consist of hundreds or thousands of microcells, wherein these many microcells are connected in parallel to form one or more output signals and are thus capable of receiving thousands or hundreds of thousands of photons simultaneously. Moreover, because of the parallel connection of the many microcells into cell groups (domains), sufficiently free cells for the signal photons are still present even in the event of solar background light.

In contrast to the comparatively costly photomultiplier tubes having large time jitter, the modern SiPM sensors are cost-effective and have time jitter in the picosecond to sub-picosecond range. Moreover, the SiPM arrays are manufactured by means of a conventional CMOS technology process, which additionally enables the integration of electronic components and circuits. Furthermore, SPADs and SPAD arrays have the advantage in relation to conventional APDs of a low break voltage. In the case of silicon SPADs, these voltages are typically at 25 to 70 V, which simplifies the activation. This is comparably true for the SPAD arrays made of the semiconductor material InGaAs.

The high photosensitivity is to be attributed to the avalanche mechanism, wherein the individual microcells of the array are operated, for example, in the overvoltage range ("reverse voltage beyond the break voltage"), i.e., above the break voltage, at which a single photon triggers an avalanche of electrons, whereby the signal is strongly amplified depending on the setting, for example, an amplification up to a factor of a million. The current associated with the photon is easy to convert into a voltage signal because of its strength and to supply without substantial amplification to a signal analysis unit.

An SPAD array is capable of receiving multiple photons simultaneously, wherein the currents of the many microcells on the sensor chip can be added and subsequently can be converted, for example, via a resistor or a transimpedance amplifier into a voltage signal. The SPAD array can be configured, for example, having more than ten thousand microcells, for example, such that it behaves like an analog photosensor, wherein the characteristic curve is approximately proportional to the intensity of the incident laser pulse in the case of weak reception signals, for example.

The literature differentiates between SPAD array operation in the linear mode, Geiger mode, and SPL mode (SPL, "single-photon lidar").

In the linear mode below the break voltage, an amplification dependent on the reverse voltage and temperature occurs and SPAD arrays can be used, for example, to construct high-sensitivity photoreceivers having output voltage proportional to the radiant power.

In the Geiger mode and SPL mode, i.e., respectively in operation above the break voltage, SPAD and SPAD arrays can be used for single-photon counting. In the SPADs, each individual pixel generates an output signal in the Geiger mode, wherein the electron avalanche is triggered by precisely one photon. If a photon packet of multiple photons is incident, a larger signal is not measured. Therefore, no amplitude information is present.

In the Geiger mode, an incident photon packet merely generates a (binary) event signal, which is not proportional to the number of photons in the photon packet.

SPL mode is understood as an SPAD array operated in the Geiger mode, wherein many microcells are connected in parallel to form an output signal. In the case of incident photon packets having only a few photons, the individual avalanches add up practically linearly and the amplitude of the output signal is therefore proportional to the number of acquired photons.

The recovery time of the microcells after a photonic trigger is not zero but rather, for example, between 5-50 nanoseconds, whereby the apparent sensitivity of the SPAD array to subsequently incident photons is reduced. However, this has the advantage, for example, that the sensor can acquire a signal strength range with high dynamic response. This nonlinearity is monotonous in SPAD arrays having a large number of microcells (>1000) and results, on the one hand, in amplitude compression between input and output signals and, on the other hand, as the input signal becomes larger, in an attenuated increasing output signal. Interestingly, the output signal of SPAD arrays having a high number of microcells (>1000) does not completely saturate, and therefore even in the case of a received pulse having a very high photon number of well over a million, an amplitude change is measurable.

An SPAD array having sufficient cell number acquires the reception signal amplitude over a large dynamic range and in a certain way compresses the input amplitude of very small to very large signals. The SPAD array practically never overloads, not even in the case of very large signals, for example not even if the radiation is reflected by an angle-precise retroreflector. At a photon number of $10^9$, the output signal of the SPAD array asymptotically approaches a maximum limiting voltage, which is adapted to the downstream amplifier circuit and guarantees that the downstream electronics up to the time measuring circuit are not overloaded. An accurate distance measurement over a high dynamic range is thus possible for the first time.

In the laser distance measurement at different distances and varying surfaces, the number of the photons can vary, for example, from fewer than 10 to greater than $10^9$. SPAD arrays display a compression factor of the measured signal amplitude in relation thereto which is at least $10^4$, typically $10^8$ in relation to the actual signal amplitude. Therefore, SPAD arrays can measure both on black diffuse targets and also on retroreflectors, without the receiving unit requiring a signal regulation. Due to the large amplification, SPAD arrays moreover have, for example, a low noise and SPAD arrays having high filling factor display a signal-to-noise ratio (SNR) suitable for distance measurements. The more microcells an SPAD array has, the greater the accessible SNR is.

The receiver can be configured according to a further embodiment such that the sensor is designed as an arrangement of single-photon avalanche photodiodes (SPAD arrangement) which has a plurality of microcells and is configured such that the microcells are readable individually and/or in microcell groups and thus individually readable subregions of the receiver are definable, and/or the receiver has multiple SPAD arrangements, wherein the multiple SPAD arrangements are configured such that individually readable subregions of the receiver are each definable such that they are based on microcells of a single SPAD arrangement or on microcells of a combination of SPAD arrangements of the multiple SPAD arrangements. In arrangements of multiple SPAD arrays (SPAD arrangements), the individual arrays are often referred to as pixels, although each of these pixels themselves consists of hundreds to tens of thousands of microcells.

According to a further embodiment, the computer unit is configured to carry out an evaluation of surfaces of the target object irradiated using the emitted beam based on cross-sectional components of the received beam acquired using the subregions of the receiver, in particular wherein the evaluation is based on at least one of the following: a runtime comparison of runtimes of the set of runtimes, and a signal strength comparison of reception signals acquired using different subregions.

The subregions (domains) of the receiver which are associated with dedicated parts of the emitted beam cross section, for example, thus supply items of information or reception data about the object surfaces irradiated by the laser beam, in particular, as a result, the distances and the associated reflection signal strengths.

Thus, for example, in a 3D scan, surfaces having different scattering properties can be recognized and possibly marked. By way of an analysis of the runtime difference and the respective signal strength, for example, equally remote target points, i.e., target points which have the same signal runtime, on different surfaces can be recognized.

The reception data can be acquired, for example, such that the distance to the target point is derivable based on the reception data, i.e., the reception data are acquired as distance measurement data, or they can be defined in an object-adapted manner based on the evaluation of subregions of the receiver for an acquisition of specific distance measurement data.

The subregions (domains) of the receiving unit can be configured appropriately for an optimum resolution of the object surface, for example, corresponding to lines or contours recognizable under the aiming direction, such as steps, borders, edges, pipes, etc. In the case of irregular contours, a general configuration connection of microcells into cell groups (domains) is rather advantageous and the interconnection then takes place in the form of lines and columns. One line and one column at a time are each supplied to a distance measuring unit and analyzed. Subsequently, the column of the activated cells is shifted further and the next distance measurement is performed at this angle setting. This continues until the entire matrix is queried. This readout can also be parallelized, for example, wherein this requires the device to comprise further distance measuring units.

In particular, according to a further embodiment, the receiver and the computer unit are configured to take the evaluation into consideration when deriving the distance to the target object, in particular wherein, based on the evaluation, the distance to the target object derived from the received beam is identified as incorrect, or distance measurement data which are acquired using different subregions of the receiver are weighted differently, or a further set of adapted individually readable subregions of the receiver is defined for the target object.

The distance meter according to some embodiments of the invention can thus recognize faulty signals as a result of multiple targets and correct or discard them, for example, or on the basis of a combination criterion, for example, an intensity ratio, can combine the individual partial signals, or distance components, respectively, and output a corrected distance for the spatial targeting direction of the laser axis.

In particular, different angle or target directions can be associated with respective individual subregions of the receiver, whereby a distance measurement having a lateral spatial resolution greater than the lateral spatial resolution defined by the total beam cross section of the emitted beam is enabled.

According to a further embodiment, the receiver and the computer unit are configured, for example, such that a defined cross-sectional component of the emitted beam, i.e., a component of its lateral dimensions, can be associated with respective individually readable subregions of the receiver, in particular wherein a defined target direction in relation to the target axis can be associated with the cross-sectional component.

For example, the distance meter according to some embodiments of the invention can be installed in a geodetic or industrial measuring device such that the individually readable subregions (domains) of the SPAR receiver are calibrated with the angle coordinate system of the geodetic or industrial measuring device. The receiving unit of the distance measuring device therefore comprises a number of receiving units having spatial direction resolution which are associated with at least one laser beam.

Upon use of a fixed-focus receiving optical unit, the received light spot of the measurement beam does change in its size (dimensions) on the SPAD array as a function of the measurement distance, wherein, however, an elevated spatial resolution of the distances of the object surfaces irradiated by the laser can be caused, for example, by means of a first rough location-resolved distance measurement associated with the domains and a subsequent spatial unfolding with consideration of the transfer function of the receiving channel, whereby a three-dimensional spatial image can be obtained.

For example, a further embodiment of the invention relates to the receiver and the computer unit being configured to derive raw distance data respectively associated with the subregions of the receiver, to carry out an unfolding algorithm, for example, based on an optical imaging model with consideration of the receiver optical unit and measured raw distances, to derive a set of fine distances, based on the raw distance data, especially wherein one fine distance is derived for each subregion of the set of subregions, and to associate fine distances with defined target directions in relation to the target axis. The raw distance data associated with the subregions can also have, for example, additional measurement data such as signal amplitudes, chronological pulse widths, or pulse forms. The unfolding algorithm also includes the raw distance data of the adjacent subregions in the determination of the fine distances.

The set of fine distances thus defines a distance measurement having a lateral spatial resolution greater than the lateral spatial resolution defined by the total beam cross section of the emitted beam. Furthermore, for example, the true distance on the laser axis can be ascertained and output on the basis of a combination algorithm with incorporation of the fine distances and signal strengths ascertained for the target directions (cell groups).

For example, the computer unit can be configured to carry out an automated preprogrammed measurement procedure having the following steps: deriving the set of raw distances, deriving the set of fine distances, and associating fine distances with defined target directions in relation to the target axis.

The derivation of the fine distances associated with the target directions can be based, for example, on at least one of the following: a lookup table which enables a correlation between a raw distance and a beam diameter of the emitted beam imaged on the receiver, and a function which outputs a beam diameter of the emitted beam imaged on the receiver based on the raw distances as function parameters.

To reduce the number of the output signals and thus, for example, to simplify the distance measuring unit and save power, the microcells can be combined into a few subregions, for example, into four quadrants each having one signal output. A TDC time measuring unit is then implemented on each output signal, for example, and associated with an FPGA.

For example, the receiver, in particular the SPAD array, can be configured such that the sensor surface is electronically allocated into permanently defined subregions, for example, four different subregions in quadrant allocation, for example wherein a different target direction is associated with each subregion, in particular wherein the individual subregions mutually do not overlap.

According to a further embodiment, the receiver is configured, for example, by means of a filter mask having different filters with respect to transmission behavior, especially an RG mask, an RGB mask, or an RGBNir mask, such that the sensor surface has regions having spectral photosensitivity different from one another, in particular wherein the transmitter is configured to generate the emitted beam over a defined wavelength range adapted to the filter of the filter mask, for example by means of generation of coaxial laser beams of different wavelengths. For example, on the receiving side, a blue laser, a green laser, a red laser, and possibly an infrared laser is respectively associated with each subset of microcells of the SPAD array.

The evaluation of the reception data can thus take place with respect to the received beam acquired using sensor regions of different spectral photosensitivity, wherein the computer unit is configured, for example, to take into consideration diffraction effects of the speckle field based on the regions with spectral photosensitivity different from one another, when carrying out the evaluation, in particular when deriving the fine distances.

For example, it is possible to measure using multiple color channels simultaneously by means of an RG mask, RGB mask, or RGBNir mask on the pixels, i.e., respectively one subset of microcells of the SPAD array or respectively one individual SPAD array upon the use of multiple individual SPAD arrays as the sensor surface. The laser beams or laser bundles of different wavelengths are typically of Gaussian profile and do not have sharp lateral margins. A sharp spatial separation in the lateral direction and thus a location resolution in the object space takes place on the receiver side, on the one hand, due to the large optical receiver opening and, on the other hand, due to the wavelength-coded subregions of the SPAD array. Even if the at least two laser bundles of different wavelengths spatially overlap, the color-coded subregions generate a sharp spatial separation and thus a higher spatial resolution. For example, depending on the design of the RGBNir pattern on the SPAD array, in addition to elevating the spatial resolution, chromatic textures on objects are also recognizable, whereby the influence of laser speckles is reducible and a distance measurement with an elimination of the atmospheric dispersion is enabled. Furthermore, for example, a lateral location resolution can also take place with surfaces at equal distance having different spectral reflectivity.

A pulse coding is generally applied to the laser signals of a distance meter. Typical pulse rates are between kHz to GHz. Experiments have shown that such signals can be received well using SPAD arrays at voltages in overbreak operation. Pulse packets (bursts) are also to be received unambiguously and nearly without noise using SPAD arrays. This is also the case, for example, if the recovery time of the microcells is quite long at ten nanoseconds. Because of the analog construction of SPAD arrays, a photocurrent present due to ambient light can also be received, for example. The laser signal is then overlaid on the electrical photocurrent of the ambient light. For example, the power surge generated by the laser pulse at the output of the SPAD array is also high-pass filtered, so that the slow rear signal flank is shortened. The output pulse thus becomes a short signal pulse, for example, having a pulse duration less than one nanosecond. Such short pulses having steep flanks are suitable for precise time measurement and thus also distance measurement.

Without a differentiator, for example, a high-pass filter, the output signal of an SPAD array essentially has the form of a step function having very steep rise (<200 ps) and slow fall (>>10 ns). Using an electrical differentiator unit, for example, the advantages result of a short pulse form and the rising speed of the rising flank of the SPAD response merges into a pulse width, whereby, for example, a pulse width measurement is enabled. The stronger the laser pulse, the steeper the rising flank is before the high-pass filter (differentiator), whereby the pulse width becomes amplitude-dependent after the differentiation. A range walk compensation is thus possible, for example. However, the use of a differentiator has no influence on the recovery time of the SPAD array.

Furthermore, first implementation experiments have already been undertaken to integrate more electronic functionality into the SPAD arrays. For example, time measuring circuits ("TOF circuitries") associated with each microcell have already been implemented. These measure the runtime (TOF, "time-of-flight"). SPAD array implementations exist, for example, wherein a precise photon counter is integrated close to the microcells, which manages without a downstream analog-to-digital converter (ADC). Moreover, for example, a time measuring circuit (TDC, "time to digital converter") can be integrated in each microcell. Furthermore, a digital interface is used as the output of the SPAD array, for example. Such building blocks are completely digital and do not require "mixed signal processing" in the CMOS production.

In a further embodiment, the distance meter has a receiving circuit, which is configured for processing the reception signal and to provide at least one of the following: a waveform digitization of the reception signal with sub-picosecond-accurate time resolution, a time measuring circuit comprising a time-digital converter, and a phase measurement of the reception signal with respect to an emitted signal provided by the emitted beam, for example wherein the receiving circuit has a differentiator, in particular an electrical high-pass filter.

In multichannel distance measuring units (parallelization of distance measurements), consisting of a multibeam emitter and receiver, for example, TDC time measuring circuits in an FPGA ("field programmable gate array") suggest themselves as a very compact analysis unit, which can also be parallelized. Furthermore, a pulse width measurement can be carried out using a TDC, but not an amplitude measurement. An amplitude measurement requires, for example, an additional measuring unit.

In contrast, for example, a higher time resolution than with previous TDC and in addition a simple amplitude measurement is possible by means of waveform digitization (WFD).

On the one hand, there is furthermore interest, for example, in all microcells of an SPAD array having a uniform signal irradiation supplied as much as possible, whereby the SPAD array behaves similarly to an avalanche photodiode (APD) in the linear mode. On the other hand, SPAD arrays display a so-called faulty directional diagram, wherein the runtime of the signal response is dependent on the position of the light spot on the SPAD array. For example, the microcells at the edge of the SPAD array are slower than in the middle. This runtime effect can be averaged out by a uniform illumination of all microcells. Light guides suggest themselves in particular as light mixers, because no light is lost thereby.

In a further embodiment, the distance meter has a fiber coupling and is configured such that returning parts of the emitted beam are distributed uniformly onto the sensor by means of light mixing, in particular wherein the light mixing is based on at least one of a diffuser, a fiber-optic light guide rod, a light guide having scrambler, a light guide fiber, a square fiber, a light funnel, an aperture, and a defocusing.

The distance meter according to the invention will be described in greater detail solely by way of example hereafter on the basis of exemplary embodiments schematically illustrated in the drawings. Identical elements are identified with identical reference signs in the figures. The described embodiments are generally not shown to scale and are also not to be understood as a restriction.

BRIEF DESCRIPTION OF THE DRAWINGS

In the specific figures

DETAILED DESCRIPTION

Figure 1A:
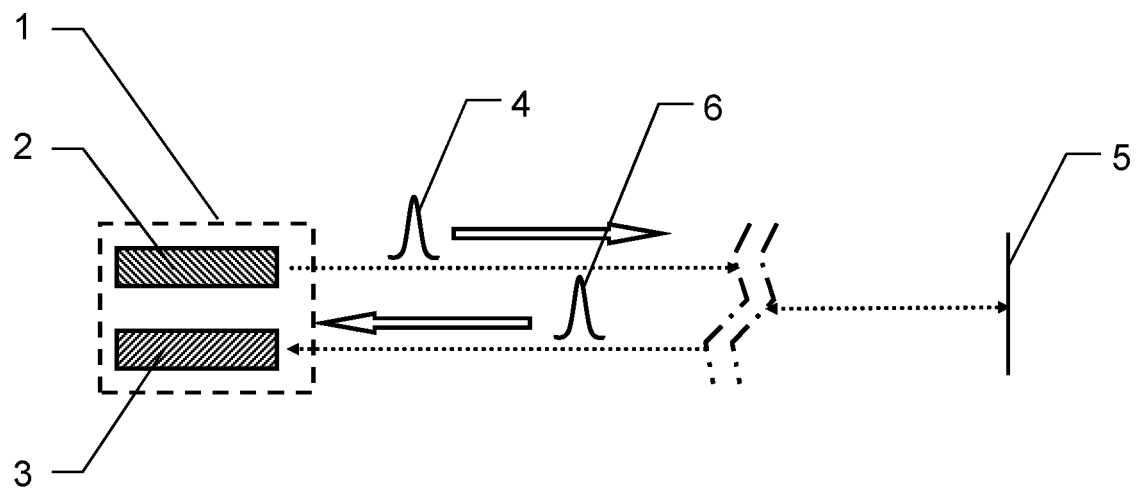
FIGS. 1a, b: show a schematic illustration of an electrooptical distance meter according to the pulse runtime principle.

FIG. 1a shows a schematic illustration of an electrooptical distance meter 1 of the prior art according to the pulse runtime principle. An emitter 2 and a receiver 3 are arranged in the distance meter 1. The emitter 2 emits a light pulse 4, which, after the reflection and/or backscattering on a target 5, for example a cooperative target, for example a retroreflector, or an uncooperative target, for example a natural surface, is detected again by the receiver 3 as returning light or radiation pulse 6. Instead of the light pulses, for example, a continuously modulated emitted signal can also be used according to the invention.

Figure 1B:

As shown in a schematic illustration in FIG. 1b, the distance is ascertained from the runtime T as the chronological difference between the starting time of the emission of a light pulse 4 and the reception time of the returning light pulse 6. In a linear photodiode, for example, an APD-operated diode in the linear mode, the optical signal 6 is converted into a corresponding electronic signal. The ascertainment of the reception time of this electronic signal is carried out in this case by the analysis of a feature of the signal pulse s(t), for example, by the passing of a signal threshold or by focal point determination of the integrated pulse curve. In the case of the threshold value method, other methods are also usable for measuring the runtime T, for example, the conversion of the reception signal into a bipolar signal and subsequent determination of the zero crossing.

Figure 2A:
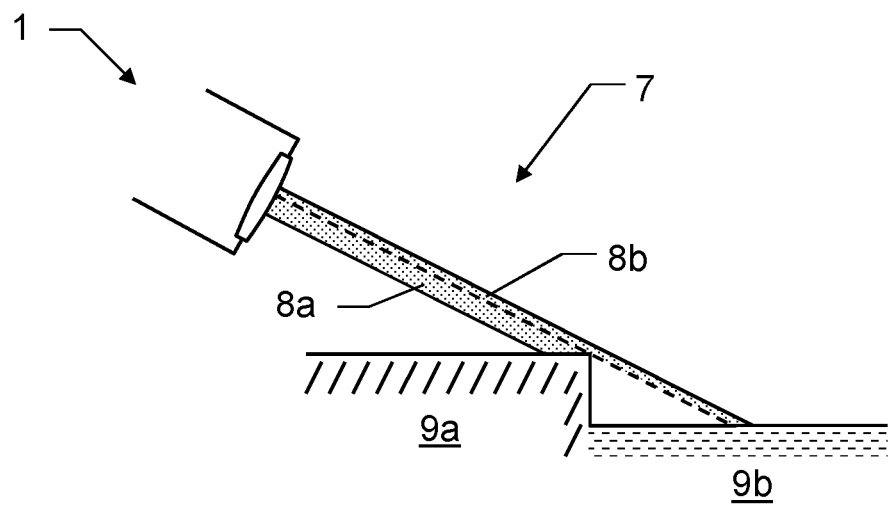
FIGS. 2a, b: show a schematic illustration of the problem of multiple targets acquired by the emitted beam of an electrooptical distance meter.
Figure 2B:
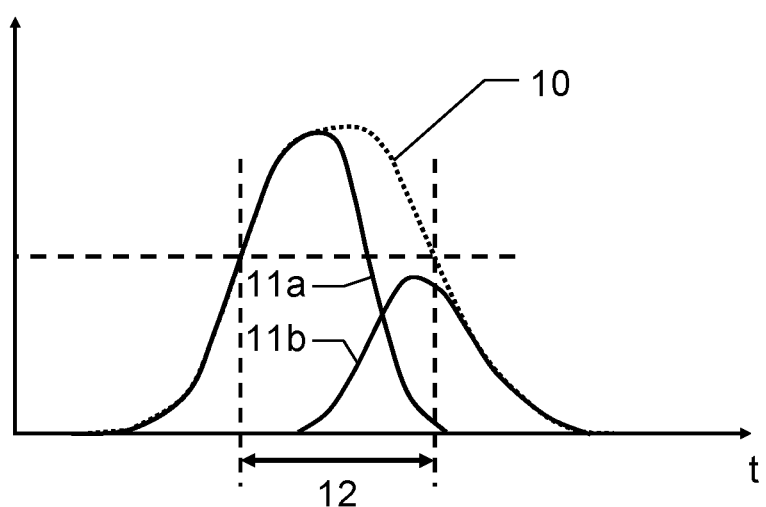

FIGS. 2a and 2b show, by way of example, the problems of multiple targets acquired by the emitted beam 7 of a laser distance meter 1.

Due to the finite lateral dimensions of the emitter-side laser measurement beam 7, the lateral resolution on the target object is generally limited and multiple targets can be acquired because of the finite lateral beam diameter, for example, double targets as shown in FIG. 2a if the emitted beam 7 passes over an edge or step. The returning emitted beam then contains the runtime information with respect to two different measurement distances 8a, 8b. Furthermore, the surfaces 9a, 9b acquired by the two beam parts 8a, 8b can have different reflectivities or spectral properties, whereby one signal can dominate, for example.

The two beam components 8a, 8b then generate, for example, as shown in FIG. 2b, a WFD reception signal 10 which is pulse-widened with respect to the time axis t, based on the partial signal 11a with respect to the first surface 9a and the partial signal 11b with respect to the second surface 9b.

A distance meter based on the WFD method can recognize multiple targets and possibly resolve them, for example, if the received pulses 11a, 11b associated with the targets are sufficiently far apart from one another. However, the capability of separating multiple objects is dependent, for example, on the receiver bandwidth. In the case of edges, steps, and corners, for example, an overlap of the return pulses therefore arises and the individual distances cannot be measured sufficiently accurately. The WFD method does then recognize an anomaly of the received pulse in the form of a pulse widening 12, but a sufficiently accurate decomposition into two individual pulses 11a, 11b is not possible.

Figure 3:
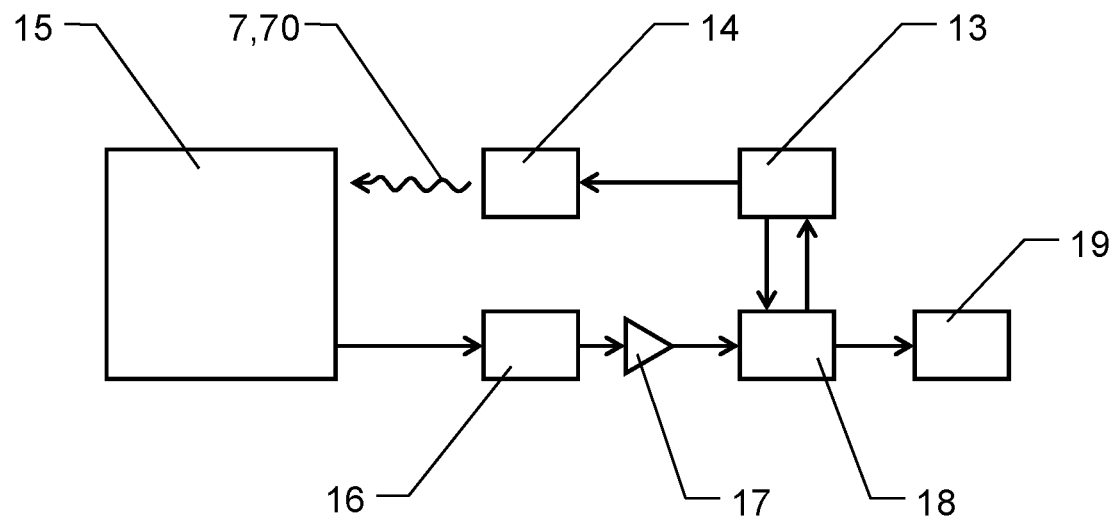
FIG. 3: shows an exemplary circuit for a distance measurement according to the invention by means of a combination of a sensor based on at least one SPAD array with a waveform digitization (WFD)

FIG. 3 shows, by way of example, a circuit for a distance measurement according to the invention by means of a combination of a sensor based on an SPAD array with a waveform digitization (WFD).

For example, the distance meter according to the invention comprises a laser 14 activated by a control unit 13 for emitting a pulsed laser measurement radiation 7, which is incident after the reflection and/or backscattering on a target (not shown) as received radiation 70 on a detector having an SPAD array 15. The detector is configured as a "multi-pixel receiver", wherein multiple signal outputs are provided by combining subsets (domains) of all microcells to form an associated output signal in each case. "Pixel" thus relates here to "target pixels" acquired by the emitted beam.

The at least two (analog) reception signals generated by the SPAD array 15 are each supplied, for example, to a differentiator 16, for example, a high-pass filter, and subsequently relayed, for example, via an amplifier 17, to a waveform digitization unit 18, whereby, for example, a high time resolution and a determination of parameters such as, for example, pulse width, pulse form, and signal amplitude is enabled. The at least two reception signals output by the SPAD array require a multichannel distance measuring arrangement or a multiplexer unit to supply the reception signals in chronological succession to a single distance measuring unit.

According to the invention, a runtime is associated with each of the at least two reception signals 11a, 11b (see FIG. 2b), for example, and it can be recognized based on a comparison of the runtimes whether the received beam 70 has in its lateral dimensions parts of the emitted beam 7 returning from a single target or a multiple target.

One embodiment of the waveform digitization (WFD) is based, for example, on a combination of an initial measurement signal detection on the basis of the threshold value method with a signal sampling having downstream signal processing for precise identification of the amplitude of the measurement signal.

For example, the measurement signal detection is carried out by means of an (in particular analog) comparator stage for generating a comparator output signal depending on a fulfillment of a criterion by the incoming measurement signal.

Alternatively, the signal can also be sampled and recorded during the entire duration between two emitted pulses and subsequently processed on an FPGA.

The signal sampling can be carried out, for example, by means of an ADC digitization stage (ADC, "analog-to-digital converter"), wherein a sampling of an input signal supplied to the digitization stage and thus a conversion into sampled digitized values takes place at a defined sampling rate.

The cleaned distance measurement data, which are range-walk compensated, for example, are subsequently transmitted, for example, to a storage unit 19 and provided to a user.

Figure 4:
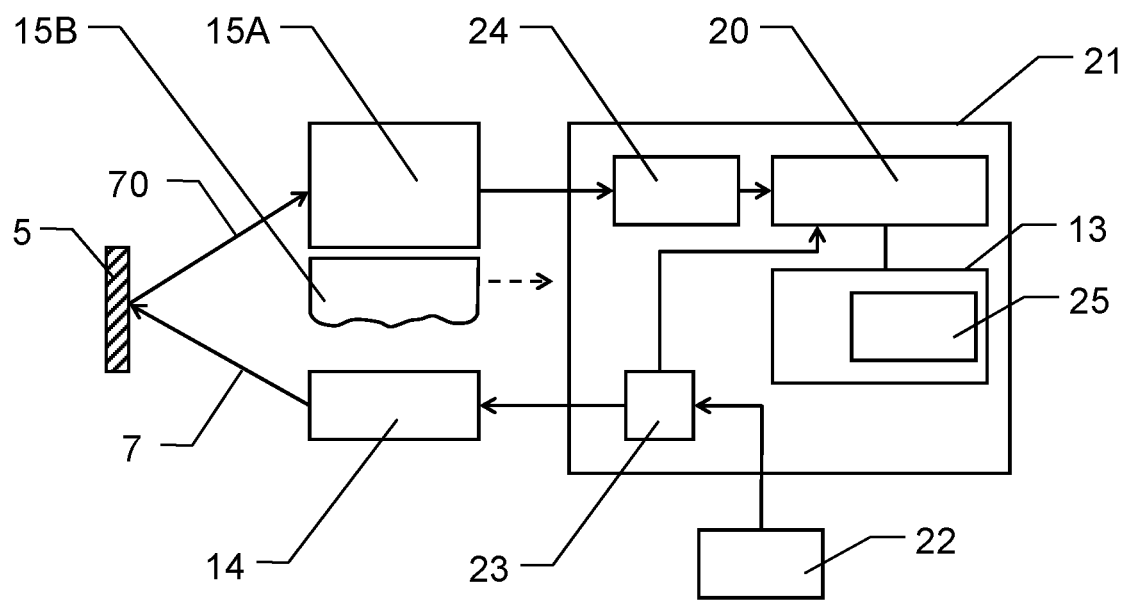
FIG. 4: shows an exemplary circuit for a distance measurement according to the invention by means of a combination of a sensor based on one or more SPAD arrays with a TDC time measuring circuit implemented in an FPGA.

FIG. 4 shows, by way of example, a circuit for a distance measurement according to the invention by means of a combination of a sensor based on one or more SPAD arrays 15A, 15B comprising a time measuring circuit consisting of a TDC time measuring circuit 20 ("time to digital converter") implemented in an FPGA 21 ("field programmable gate array").

SPAD arrays are suitable for multichannel arrangements (multibeam) because of the high and low-noise signal amplification thereof. According to the invention, multiple targets each acquired for a single-point measurement in the received beam can be recognized by means of "multi-pixel receivers", i.e., one or more SPAD arrays comprising multiple signal outputs, which are each associated with a microcell domain. The term "single-point measurement" is understood in this case such that for an object surface struck in a one-dimensional linear targeting direction, the distance is measured as exactly as possible.

Furthermore, for example, the "single-point measurements" according to the invention can also be parallelized for a multichannel measurement (multibeam). For example, in multichannel distance meters, consisting of multibeam emitter configured for a parallelization of the distance measurements and receiver, a TDC time measuring circuit in the FPGA suggests itself as a compact analysis unit which can also be parallelized.

On the emitter side, for example, a fiber amplifier "seeded" using laser diodes can be used, which has a 1-to-N fiber coupler at the output. A bundle of laser beams may be generated using this in a simple manner, which radiate toward the object to be surveyed.

The receiver can be constructed, for example, from multiple SPAD arrays 15A, 15B, which are arranged either one-dimensionally or two-dimensionally, for example, also two-dimensionally on a sphere. Each domain on the SPAD arrays 15A, 15B either has separate activation and/or analysis electronics. Because of the compactness, for example, a set of TDC channels in an FPGA may also be preferred. Alternatively, the outputs associated with the domains on the SPAD arrays can optionally be addressed via a multiplexer and supplied to a common time measuring circuit.

In the embodiment shown, the circuit comprises, for example, an oscillator 22 as the time base, for example, having sub-ppm ("parts per million") precision, which drives a clock 23 implemented in the FPGA 21. The clock 23 is used, on the one hand, for the activation of a laser 14 and, on the other hand, as the basis for the TDC time measuring circuit 20 implemented in the FPGA 21. The laser 14 emits a pulsed or pulse-like modulated laser measurement radiation 7, which is incident after the reflection and/or backscattering on a target 5 as the received radiation 70 on a detector having one or more SPAD arrays 15A, 15B. Furthermore, for example, a comparator 24 upstream from the TDC 20 is implemented in the FPGA 21.

The runtime measurement takes place on a computer unit 13, which is also implemented directly on the FPGA 21, wherein, for example, a range walk is also compensated for via a lookup table 25 implemented on the FPGA 21.

Figure 5:
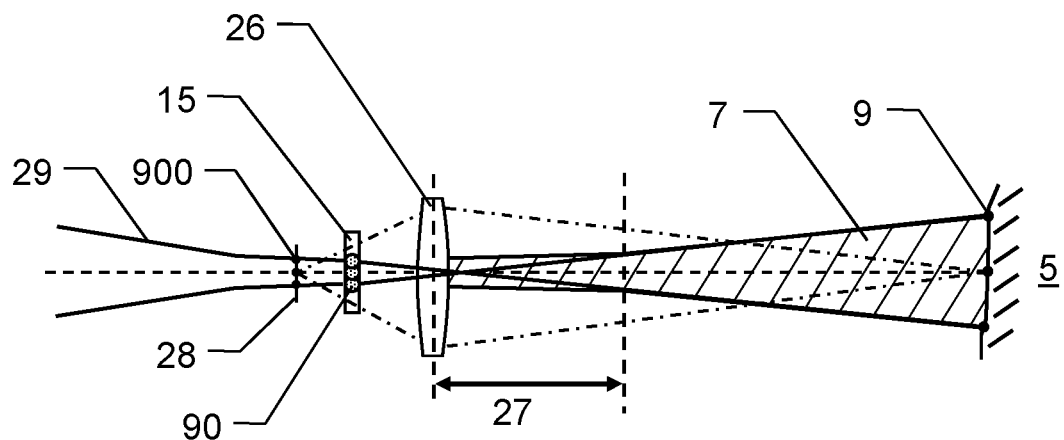
FIG. 5: shows a schematic illustration of scattering circles, which occur in the case of a fixed-focus receiving optical unit, of the received light spot of the received beam on the receiver.

FIG. 5 shows a schematic illustration of scattering circles, which are dependent on the measurement distance, of the received light spot of the received beam on the receiver occurring in the case of a fixed-focus receiving optical unit 26.

The figure schematically shows the position of the SPAD array 15, the receiving optical unit 26, and a target surface 5 having surface points 9. Furthermore, the beam widening of the measurement beam 7 from the Rayleigh length 27 is schematically indicated.

The surface points 9 are imaged as image points 900 in the image plane 28 of the receiving optical unit 26, wherein the geometrical location 29 of the image planes is indicated for different measurement distances.

For example, a distance-dependent blurred region arises on the SPAD array due to the positioning of the SPAD array 15, typically close to or in the focal point, for the respective light spots associated with the object points 9. At short distances, the light spots are elongated, illustrated in the figure by corresponding scattering circles 90. In the receiver according to the invention, scattering circles 90 are implemented as subregions made of microcells. One direction in the object space has associated with it each of these scattering circles 90, whereby a laterally spatially resolved distance measurement can be implemented by means of the subregions on the SPAD array. In particular, the spatial resolution of the receiving optical unit is substantially higher than that of the emitting channel, since the receiving channel certainly has a larger pupil than the emitting channel. This blurred region (scattering circle) can be determined by means of distance measurement and the lateral location resolution on the object can be increased in a further step by means of unfolding (deconvolution).

For example, on the basis of an automated preprogrammed measurement procedure, in each case firstly a rough distance to the target plane 5 can be determined, wherein subsequently distance-dependent blurred regions and target directions (angles in the object space in relation to the target axis) can be associated with the individual subregions of the SPAD arrangement.

Figure 6A:
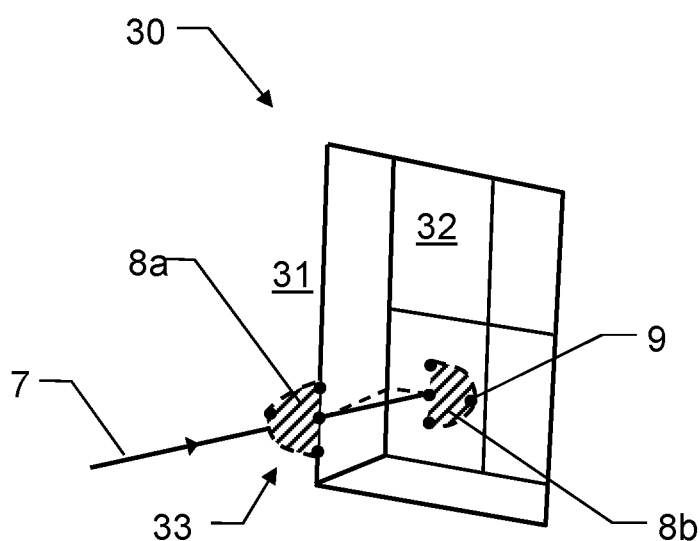
FIGS. 6a-c: show an exemplary light distribution on the receiver as a function of the hyperfocal distance.
Figure 6B:
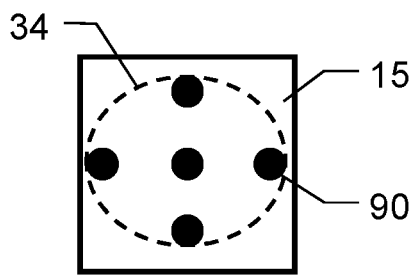
Figure 6C:
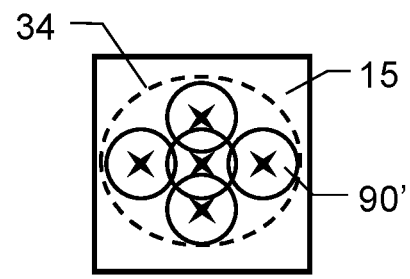

FIGS. 6a-6c show, by way of example, a light distribution on the receiver as a function of the hyperfocal distance, for example, in the case of measurement by means of a laser measurement beam 7 on a window 30.

As indicated in FIG. 6a, a first part 8a of the measurement beam 7 is incident on the window frame 31, which is located closer, and a second part 8b of the measurement beam is incident on the windowpane 32. Different measurement points 9 are acquired by the light spot 33 of the measurement beam 7, wherein the laser light spot 34 imaged on the SPAD arrangement 15, for example, for distances greater than the hyperfocal distance, as indicated in FIG. 6b, generates a sharp image of the object/the objects having high location resolution, i.e., having sharp appearing spot images 90 of the measurement points 9. For distances shorter than the hyperfocal distance, as indicated in FIG. 6c, the object irradiated by the laser is imaged as a blurred light spot 34 on the SPAD array 15 and the image zones 90' associated with the measurement points 9 display greater blurriness than at long distances. The image zones 90' can be implemented by subregions made of microcells. Since the zones 90' are still individually identifiable according to FIGS. 6b and 6c, the runtimes or the associated measurement distances to the subregions 8a, 8b can be recognized or determined, respectively, in a spatially-resolved manner. Moreover, for example, the lateral resolution can be further improved by means of deconvolution.

Figure 7A:
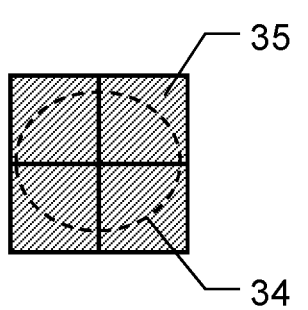
FIGS. 7a-c: show schematic SPAD arrangements, each having different matrix-type subregions (domains)
Figure 7B:
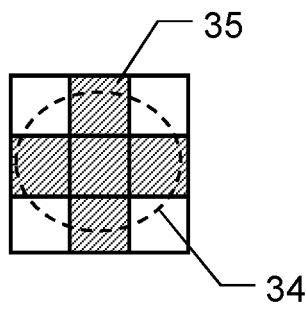
Figure 7C:
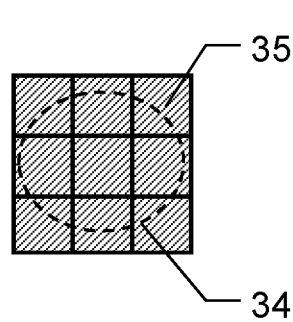

FIGS. 7a-c schematically show SPAD arrangements 15, each having different matrix-like subregions (domains) 35 consisting of many microcells, namely having four domains in quadrant allocation (FIG. 7a), having five domains in cross arrangement (FIG. 7b), and having 9 domains (FIG. 7c).

Figure 9A:
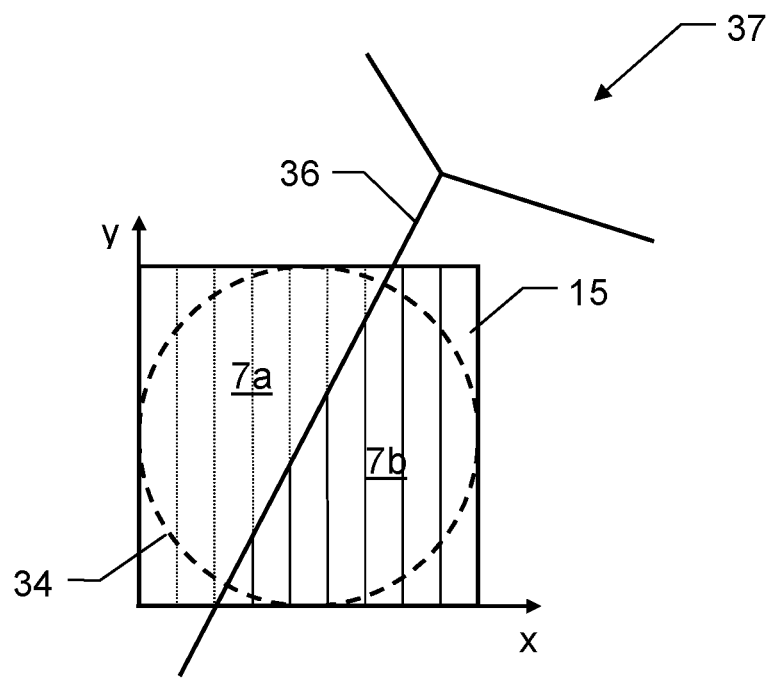
FIGS. 9a, b: show a recognition of an edge line by activation and readout of microcells in lines and columns.

The SPAD array 15 can be electronically divided into fixed domains in this case, for example, wherein each domain respectively generates a separate output signal. Alternatively, however, the microcells can also, for example, be locally activated sequentially as shown in FIG. 9a, for example, first activation and readout of microcells by line and then by column, to thus query different positions on the detector and therefore define variably settable domains.

Previous distance measuring units could remedy the mixed pixel problem (multiple targets acquired by the emitted beam) if at all only with restricted time and location resolution. A conventional distance meter typically shows a single mean distance for multiple measuring points 9 (see FIG. 6a).

SPAD arrays having domain-like combination of microcells according to the invention achieve a sub-picosecond time resolution, wherein the SPAD array according to the invention is capable of enabling a location-resolved distance measurement, for example, on corners, steps, holes, slots, and edges. For example, each domain 35 generates a runtime signal that is relayed in each case to a distance measuring unit. The cross section of the imaged laser beam 34 is thus acquired in a time-resolved and location-resolved manner by the SPAD arrangement.

Figure 8A:
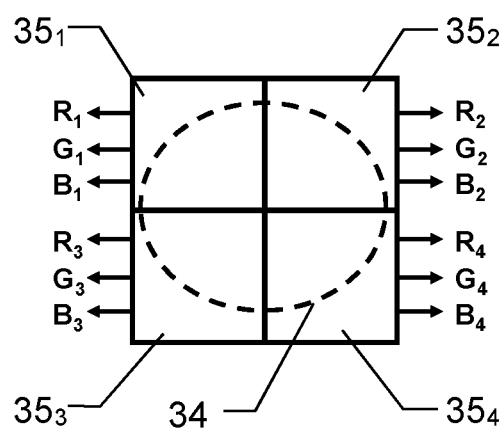
FIGS. 8a, b: show schematic SPAD arrangements having various multicolor masks.
Figure 8B:
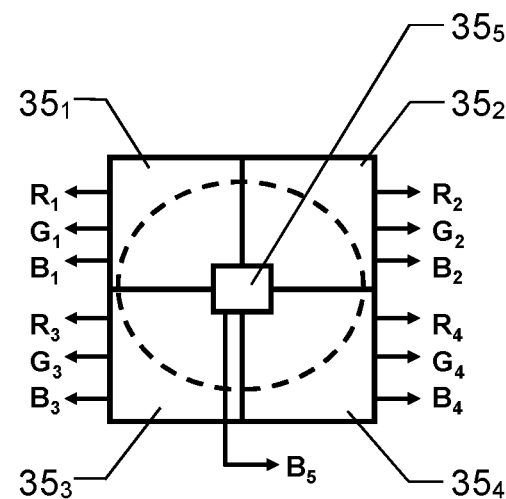

FIGS. 8a and 8b show exemplary SPAD arrays having various multicolor masks.

FIG. 8a shows an SPAD array 15 having four domains $35_{[1-4]}$, wherein these each have an RGB filter mask. The masks can be embodied, for example, as a Bayer pattern. Furthermore, the received beam 34 incident on the receiver 15 is schematically shown. The SPAD array 15 has, in this embodiment, 4×3 signal outputs $R_{[1-4]}$, $G_{[1-4]}$, $B_{[1-4]}$, which are each supplied to an analysis electronics unit, which is designed, for example, to measure the amplitude or also the runtime between target object and instrument. The measurement distances may thus be determined, and also color textures and color transitions may be established, in a location-resolved manner as described above in the four sectors around the target axis. The color information gives indications of whether the measured surface is coherent or divided into segments. A color tone change is often linked to an edge or a step. This additional information assists the computation of the real object distances associated with the four sectors $35_{[1-4]}$ (domains).

If the transmitter is configured such that the emitted beam is generated, for example, by means of a combination of a blue, green, and red laser, it is then possible to measure distances directly using all colors.

The color coding at the receiving sensor has the advantage that the background light is spectrally allocated onto the RGB color channels and the noise does not substantially increase in spite of the large spectral width. On the other hand, surfaces having a specific color, for example, blue at 440 nm, can still be measured with high signal quality.

If at least two color channels are used for measuring simultaneously, for example, using RG color channels, it is furthermore possible to affix an atmospheric dispersion correction to the raw distances, and therefore the ascertained distance is without influence of the atmosphere. For example, an ascertainment of the group index of refraction of the air via meteorological auxiliary measurements thus becomes irrelevant.

Furthermore, for example, a lateral location resolution can also take place with surfaces at equal distances having different spectral reflectivity.

The diffuse backscattering of laser radiation on rough object surfaces generates so-called speckles. Brightness variations, which result in amplitude noise and distance noise, thus arise over the receiver surface of the SPAD array. In the case of a distance measurement using multicolor or spectrally broad lasers or SLEDs (superluminescent diodes), the speckle fields associated with the individual colors are superimposed, wherein both the variation of the reception signals and also the results of the distance measurements average out. Each color channel of the SPAD array generates a distance influenced by speckles, whereby the variation of the mean value of the measured distances can be reduced.

For example, an SPAD array consisting of four domains defined by an RGBNir mask (not shown) respectively generates four runtime signals per domain, which are associated with the corresponding laser spectra. If the laser has a beam having low divergence, the lateral spatial resolution is then determined quite well by the emitted beam, but chromatically-induced distance errors are manifested via diffraction effects of the speckle field, in particular in the case of laser diode sources. However, if the distance is measured at multiple wavelengths, thus four here, for example, the error of the distance averaged over the wavelengths is thus reduced, here, for example, as one divided by the square root of four.

FIG. 8b shows an SPAD array 15 having four domains $35_{[1-4]}$ in quadrant allocation and a specially color-coded small central domain $35_5$. This central subregion $35_5$ is equipped, for example, with a blue filter mask and the four domains $35_{[1-4]}$ around the outside are provided with a conventional RGB color filter.

The blue spectral component $B_5$ having short and thus high-resolution wavelength of the laser beam is thus detected and read out in the central part $35_5$, while in contrast all wavelengths of the emitter are received in the outer quadrants $35_{[1-4]}$, as in FIG. 8a. Because of the high receiver-side optical location resolution, a distance measurement having precise location resolution can be implemented using the central subregion $35_5$, while in contrast, for example, at least one raw distance associated with the spatial directions of the subregions is ascertained using each of the four quadrants $35_{[1-4]}$ around the outside.

If an edge of a room corner is measured, for example, an exact distance to the corner is thus acquired using the central domain $35_5$. In contrast, the four quadrants $35_{[1-4]}$ ascertain a distance to the adjoining surfaces. The four distances can be allocated to the two object surfaces by means of the color information.

Figure 9B:
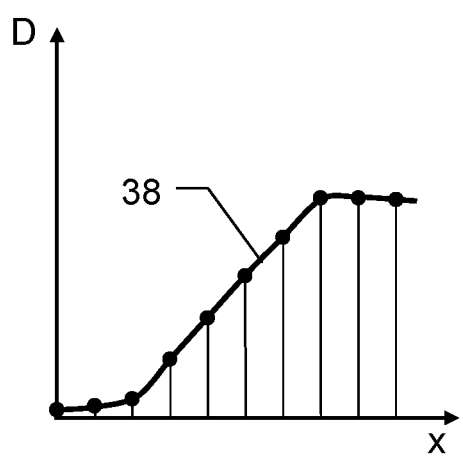

FIGS. 9a, 9b schematically show a recognition of an edge line 36 by activation and readout in lines and columns of microcells of the SPAD arrangement 15.

An edge line 36 defined by two planes occurs when measuring a room corner, for example, wherein a first partial beam 7a acquires the first wall and a second partial beam 7b acquires the second wall.

FIG. 9a schematically shows an SPAD arrangement 15 for acquiring the image of the room corner 37, wherein the received beam 34 contains the partial signals 7a, 7b with respect to the edge line 36 between the two walls. The received beam 34 is now acquired such that the microcells in a column x are respectively interconnected and generate a single distance signal D.

As shown in FIG. 9b, the interconnection of the microcells into domains as columns generates a type of projection 38 on the column axis (x axis). A similar interconnection of the microcells into domains as lines generates a further projection (not shown) on the line axis (y axis). The edge line in the room can now be concluded, for example, on the basis of these two projections.

Figure 10:
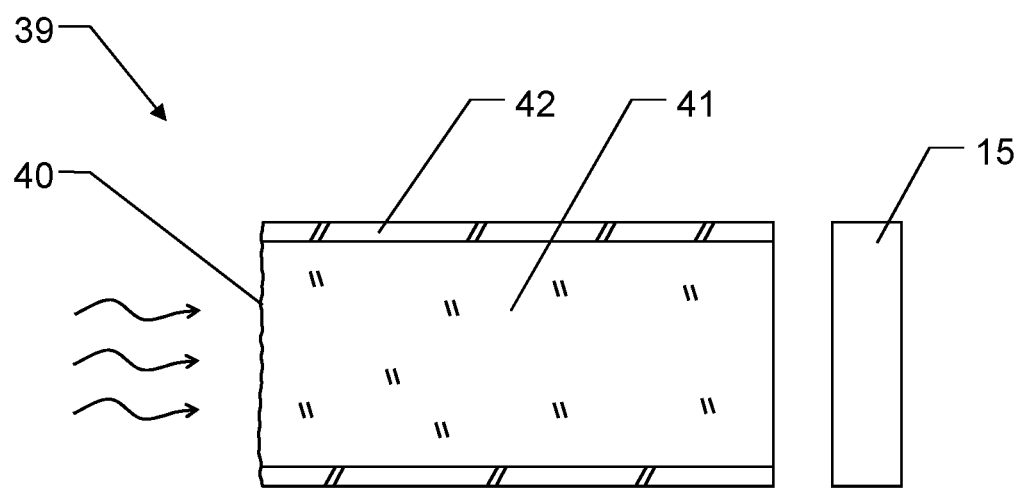
FIG. 10: shows a schematic illustration of a fiber-optic light guide having light mixer.

FIG. 10 shows a variant of how the received light can be distributed in a preferably defined homogeneous manner onto the SPAD array 15. It is the goal to preferably illuminate all microcells of an SPAD array 15 and to do so independently of the distance of the target object. Optical multimode light guides made of glass, quartz, or plastic are particularly suitable and are also known from previous APDs. A particularly homogeneous light distribution is achieved at the output of a multimode light guide by means of a mode scrambler. The fiber end can be imaged using optical imaging on the surface of an SPAD array, but the light can also be directly coupled at a short distance onto the sensitive surface.

The figure shows a special embodiment of a light guide as a square fiber 39 having matted entry surface 40. The matting generates a uniform illumination of the fiber cross section and the light guide additionally mixes the optical signal by kaleidoscopic reflection in the direction of SPAD array 15 and simultaneously encloses it by optical wave guiding in the region of the cross-sectional area. A homogeneous light distribution over the SPAD array 15 is thus ensured at the exit end of the square fiber 39. The square fiber 39 itself is constructed like a multimode light guide, consisting of a core region 41 and an optical cladding 42. The optical cladding 42 has the effect that radiation having propagation direction within the numeric aperture cannot leave the waveguide laterally.

It is apparent that these illustrated figures only schematically illustrate possible exemplary embodiments. The various approaches can also be combined with one another and with methods of the prior art.

What is claimed is:

1. A distance meter for detecting signal corruption in a reception signal of a receiver caused by the reception signal being generated by a mixture of reflection components from different targets within a received beam and taking into account the signal corruption when measuring a distance to a target object by the received beam, the distance meter comprising:
   a transmitter, which is configured to generate an oriented emitted beam, which defines a target axis, for a single-point measurement to the target object;
   the receiver for detecting the received beam to generate the reception signal, the received beam being the emitted beam returning from the target object and the reception signal being generated by a mixture of reflection components from different targets within the received beam, wherein the receiver has a multi-pixel photon counter (MPPC), which comprises hundreds or thousands of microcells and is configured to add currents of the microcells on the MPPC and to subsequently convert the added currents into a voltage signal, which asymptotically approaches a maximum limiting voltage with increasing received radiation; and
   a computer unit, which is configured to derive a distance to the target object by a time measurement based on a threshold value method or a signal sampling method applied to the reception signal, wherein:
   the MPPC and the computer unit are configured such that different individually readable subregions of the MPPC are definable, wherein the different subregions correspond to different cross-sectional components of the received beam impinging on the MPPC and a corresponding MPPC subregion output signal can be generated for each of the subregions, and
   the receiver and the computer unit are configured to use the MPPC subregion output signals to derive and compare runtimes with respect to the different cross-sectional components of the received beam, and, based thereof, to evaluate whether there is a signal corruption of the reception signal in that the received beam impinging on the receiver has in its cross section parts associated with different target distances.

2. The distance meter according to claim 1, wherein the computer unit is configured, based on the cross-sectional components of the received beam acquired using the individually readable subregions of the receiver, to carry out an evaluation of surfaces of the target object irradiated using the emitted beam.

3. The distance meter according to claim 2, wherein the receiver and the computer unit are configured to take the evaluation into consideration in the derivation of the distance to the target object, and wherein, based on the evaluation:
   the distance to the target object derived from the received beam is identified as incorrect, or
   distance measurement data which are acquired using the individually readable subregions of the receiver are weighted differently, or
   a further set of adapted individually readable subregions of the receiver is defined for the target object.

4. The distance meter according to claim 1, wherein the receiver and the computer unit are configured such that a defined cross-sectional component of the emitted beam is associated with respective individually readable subregions of the receiver.

5. The distance meter according to claim 4, wherein the receiver and the computer unit are configured:
   to derive raw distance data respectively associated with the individually readable subregions of the receiver,
   to carry out an unfolding algorithm for deriving a set of fine distances, based on the raw distance data, especially wherein one fine distance is derived for each individually readable subregion of the set of individually readable subregions, and
   to associate fine distances with defined target directions in relation to the target axis.

6. The distance meter according to claim 5, wherein the computer unit is configured to carry out an automated preprogrammed measurement procedure having the following steps:
   deriving the raw distance data,
   deriving the set of fine distances, and
   associating fine distances with defined target directions.

7. The distance meter according to claim 5, wherein the derivation of the set of fine distances is based on at least one of the following:
   a lookup table, which enables a correlation between a raw distance and a beam diameter of the emitted beam imaged on the receiver, and
   a function, which outputs a beam diameter of the emitted beam imaged on the receiver based on the raw distances as function parameters.

8. The distance meter according to claim 1, wherein the MPPC is configured such that it has at least one of the following properties:
   a photosensitivity for wavelengths between 300 nm and 1100 nm wherein the MPPC is based on a silicon receiver,
   a photosensitivity for wavelengths between 700 nm and 2000 nm wherein the MPPC is based on an InGaAs receiver,
   an overbreak operating mode, or
   a linear operating mode.

9. The distance meter according to claim 1, wherein the receiver is configured such that:
   the MPPC is configured such that the microcells are readable individually or in microcell groups and thus individually readable subregions of the receiver are definable, or
   the receiver has multiple MPPCs, wherein the multiple MPPCs are configured such that individually readable subregions of the receiver are each definable such that they are based on microcells of a single MPPC or on microcells of a combination of MPPCs of the multiple MPPCs.

10. The distance meter according to claim 1, wherein the transmitter is configured to provide the emitted beam as pulsed laser measurement radiation.

11. The distance meter according to claim 1, wherein the receiver is configured by means of a filter mask having different filters with respect to transmission behavior, such that the MPPC surface has regions having spectral photosensitivity different from one another.

12. The distance meter according to claim 11, wherein the computer unit is configured, based on the regions having spectral photosensitivity different from one another, to take into consideration diffraction effects of the speckle field when carrying out the evaluation.

13. The distance meter according to claim 1, wherein the distance meter has a fiber coupling and is configured such that returning parts of the emitted beam are distributed by means of light mixing uniformly onto the MPPC.

14. The distance meter according to claim 1, wherein the distance meter has a receiving circuit, which is configured for processing the reception signal and to provide at least one of the following:
- a waveform digitization of the reception signal having sub-picosecond-accurate time resolution,
- a time measuring circuit having a time-digital converter, and
- a phase measurement of the reception signal with respect to an emitted signal provided by the emitted beam.

* * * * *